(12) United States Patent
Vortman et al.

(10) Patent No.: US 6,771,760 B1
(45) Date of Patent: Aug. 3, 2004

(54) CALLBACK IMITATION AS INCOMING CALLS

(75) Inventors: Pnina Vortman, Haifa (IL); Yardena Peres, Haifa (IL); Iris Steinwarts, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,354

(22) Filed: Sep. 20, 1999

(51) Int. Cl.[7] .............................................. H04M 3/58
(52) U.S. Cl. ........................... 379/209.01; 379/210.01; 379/265.02
(58) Field of Search ....................... 379/265.01, 265.02, 379/265.05, 265.06, 265.07, 265.08, 265.09, 265.1, 265.11, 265.12, 265.14, 266.01, 266.03, 266.04, 266.05, 266.07, 266.08, 266.09, 266.1, 209.01, 210.01, 309, 201.01, 221.01, 221.06

(56) References Cited

U.S. PATENT DOCUMENTS

| | | | | |
|---|---|---|---|---|
| 5,040,208 A | * | 8/1991 | Jolissaint | 379/209 |
| 5,155,761 A | * | 10/1992 | Hammond | 379/266 |
| 5,181,236 A | * | 1/1993 | LaVallee et al. | 379/266 |
| 5,185,782 A | * | 2/1993 | Srinivasan | 379/266 |
| 5,206,903 A | * | 4/1993 | Kohler et al. | 379/265 |
| 5,309,505 A | * | 5/1994 | Szlam et al. | 379/265 |
| 5,740,238 A | * | 4/1998 | Flockhart et al. | 379/221 |
| 5,903,641 A | * | 5/1999 | Tonisson | 379/266 |
| 6,038,302 A | * | 3/2000 | Burok et al. | 379/201 |
| 6,044,355 A | * | 3/2000 | Crockett et al. | 379/113 |
| 6,222,919 B1 | * | 4/2001 | Hollatz et al. | 379/266 |
| 6,311,231 B1 | * | 10/2001 | Bateman et al. | 710/39 |
| 6,424,709 B1 | * | 7/2002 | Doyle et al. | 379/265 |
| 6,493,447 B1 | * | 12/2002 | Goss et al. | 379/265.09 |

OTHER PUBLICATIONS

"Internet Call Center", A White Paper by Lucent Technologies, Dec. 15, 1997.
Lucent Technologies, "JTAPI Programmer's Reference", Issue 1.0 Oct. 1997.
Lucent Technologies, "JTAPI Client Programmer's Guide", Issue 1.0 Oct. 1997.

* cited by examiner

Primary Examiner—William J. Deane, Jr.
(74) Attorney, Agent, or Firm—Darby & Darby

(57) ABSTRACT

A method for managing communication between a communications center and a party outside the center, which center has a central communications switch which is configured to generate incoming call event indications responsive to incoming calls to the center. The method includes receiving a request from the party for a callback, and establishing an outgoing call to the outside party through the switch, responsive to the request, such that the switch generates an incoming call event indication responsive to the outgoing call.

23 Claims, 9 Drawing Sheets

CALLBACK IMITATION AS INCOMING CALLS

FIELD OF THE INVENTION

The present invention relates generally to business call centers, and specifically to handling of customer callback requests in such call centers.

BACKGROUND OF THE INVENTION

For many businesses, call centers play increasingly important roles in providing superior customer service in a cost-effective manner. Call centers enable businesses to offer their customers products, services and customer support 24 hours a day, seven days a week. Sophisticated switching equipment and software for call centers enable customer calls to be routed efficiently to agents in the call center who have the appropriate skills to handle the customers' specific requirements. The software keeps records of calls in order to track customer needs and preferences, manage the agents' states and activities, and maintain statistics on agents' performance. The software also balances the load of incoming calls from customers among the available agents, using data provided by the switching equipment, in order to maximize the efficiency of use of call center resources and minimize customer waiting time.

Call centers frequently offer callback service, in order to enhance their availability to customers and avoid situations in which incoming calls from customers are kept on hold for extended periods while waiting for an agent to become available. A customer can request a callback immediately, in which case an agent from the call center returns the customer's call immediately upon becoming available, or at a later time that the customer indicates is convenient. The actual callback is, of course, an outgoing call and is handled differently from incoming calls by the switching equipment and call center software. Agents engaged in making callbacks, therefore, are removed from the pool of available agents for purposes of load balancing. Outgoing calls, which are typically dialed out by the agents, are not subject to same the sort of call tracking and acquisition of statistics as are incoming calls.

Increasingly, business Web sites offer telephony links to their call centers. For this purpose, for example, Lucent Technologies offers an Internet Call Center, which is described in a White Paper (Lucent Technologies, Dec. 15, 1997), which is incorporated herein by reference. The Internet Call Center is built around an Internet Telephony Gateway (ITG) and a Java Computer Telephony Integration (CTI) server, integrated with a "Definity" Enterprise Communications Server (ECS), which serves as the call center switching equipment. A Web site using the Internet Call Center can offer the customer the options of placing a voice call to the call center over the Internet, using a Java applet that the ITG downloads to the customer's computer, or of requesting a callback from the center to a telephone number that the customer specifies. The customer typically invokes these options by selecting appropriate on-screen controls on certain pages of the Web site.

When the customer requests a callback in this manner, an electronic mail (e-mail) message to the call center is generated. The ITG reads the message and initiates a "phantom call" through the ECS, i.e., an internal virtual message call, which does not use a connection to the public switched telephone network (PSTN) to which the ECS is coupled. The phantom call from the ITG is queued and routed by the ECS according to a Vector Directory Number (VDN) specified by the Web page from which the customer requested the callback, along with other information indicative of the customer's service needs. The VDN and other information are used by the ECS to route the callback request automatically to an agent in a group having the appropriate skills to handle the particular customer request.

When an agent in the group becomes available, the email "call" is delivered to the agent's voice terminal (i.e., the agent's telephone extension), and the CTI server notifies the ITG that the call has been answered. The ITG sends a copy of the actual e-mail message to be viewed on the monitor screen of the agent's personal computer (PC) terminal. Communications between the ITG, CTI and agent terminals are generally carried out using the Java Telephony Application Program Interface (JTAPI), as described, for example, in the JTAPI Programmer's Reference and the JTAPI Client Programmer's Guide (Lucent Technologies, October, 1997), which are incorporated herein by reference. The agent may, if necessary, forward the message to other agents for consultation or handling. When the agent is ready to speak with the customer, he or she places an outgoing call from the voice terminal, through the ECS, via the PSTN to a telephone number (or to one of a list of telephone numbers) that the customer has specified and which appears in the e-mail message.

SUMMARY OF THE INVENTION

It is an object of some aspects of the present invention to provide improved callback capabilities for call centers.

It is a further object of some aspects of the present invention to provide methods and apparatus enabling improved tracking of callbacks from a call center.

It is still a further object of some aspects of the present invention to provide methods and apparatus enabling improved load balancing among incoming and outgoing calls in a call center.

It is yet a further object of some aspects of the present invention to provide common and consistent methods to manage the states and activities of agents in the call center using a single point of control, through which all types of service requests are directed.

In preferred embodiments of the present invention, a call center is configured so that callbacks are handled as incoming, rather than outgoing, calls. The call center comprises telephone switching equipment, referred to hereinafter simply as a switch, and one or more telephony servers coupled to the switch, including a callback server for handling callback requests from customers. When a callback request is received, the callback server queues the callback request, preferably in a queue maintained as a database, for either immediate or deferred processing. At the appropriate time, the server places an incoming phantom call to a suitable agent, and the phantom call is then conferenced with an outgoing call to the requesting customer, typically using conferencing capability already built into the call center. As a result of initiating the phantom call to the agent, the switch recognizes and handles the callback as an incoming call. Callbacks are thus subject to the same statistical record generation and load balancing functions performed by the switch with respect to normal incoming calls.

In some preferred embodiments of the present invention, a customer requesting a callback is asked to specify a time or times at which the callback should be made. Preferably, the call center schedules the callbacks so as to ensure that the call load on agents (including normal incoming calls, as well) does not exceed the expected availability of agents at any particular time of day and, further preferably, so that agents do not encounter "dead times" during the day. For this purpose, the call center tracks the expected load against expected agent availability and blocks out certain times of day during which the customer may or may not request that the callback be made. Additional factors, such as customer service level agreements, are preferably also taken into account. The available times for callback are preferably displayed for customer selection on a customer service Web page associated with the call center. Alternatively or additionally, the customer may request the callback by telephone, fax or e-mail message without going through the Web page. In any case, the callback server receives the customer request and causes the switch to handle the callback as an incoming call, as described hereinabove.

Preferably, the call center enables agents to handle multiple calls concurrently or sequentially, without altering the incoming call status of callbacks. Most preferably, the incoming call status is maintained even when one agent conferences another agent into a callback conversation or transfers the call to the other agent.

There is therefore provided, in accordance with a preferred embodiment of the present invention, a method for managing communication between a communications center and a party outside the center, which center has a central communications switch which is configured to generate incoming call event indications responsive to incoming calls to the center, including:
  receiving a request from the party for a callback; and
  establishing an outgoing call to the outside party through the switch, responsive to the request, such that the switch generates an incoming call event indication responsive to the outgoing call.

Preferably, establishing the outgoing call includes placing an incoming call and an outgoing call through the switch, responsive to the request, and conferencing the outgoing and incoming calls so that the event indication is generated responsive to the outgoing call. Most preferably, placing the incoming call includes placing a call on a phantom extension of the switch.

Further preferably, the center is staffed by one or more agents at respective agent stations, and placing the incoming call includes placing an incoming call to one of the agents who is to speak with the outside party on the outgoing call. In a preferred embodiment, the method includes connecting another one of the agents in the center to the outgoing call while the outgoing and incoming calls remain conferenced, wherein the other one of the agents remains connected to the outgoing call while receiving another incoming call, even when the other incoming call is placed to the other agent responsive to another callback request from another outside party.

Preferably, receiving the request from the outside party includes storing information related to the request in a database, and the method includes, responsive to the incoming call, conveying the information from the database to the agent who is to speak with the outside party.

Preferably, the method includes recording information regarding the outgoing call using the incoming call event indication generated responsive thereto. Further preferably, the method includes balancing a load of incoming and outgoing calls among the agents responsive to the incoming call event indications generated responsive to the incoming and outgoing calls.

In a preferred embodiment, receiving the request includes receiving a request to make the callback at a time specified by the outside party, and establishing the outgoing call includes placing a call at approximately the specified time.

There is further provided, in accordance with a preferred embodiment of the present invention, a method for managing communication between a communications center and a party outside the center, including:
  offering the outside party a choice of time slots at which resources of the center will be available to place an outgoing call responsive to a callback request by the party;
  receiving the party's selection of one or more of the time slots; and
  placing the outgoing call to the party in approximately the selected time slot.

Preferably, offering the choice of time slots includes calculating a predicted work load of the center and adjusting the choice of time slots responsive to the work load. Further preferably, offering the choice of time slots includes determining, based on the callback request, which resources of the center are needed for the outgoing call and adjusting the choice of time slots responsive to the resources. Most preferably, offering the choice of time slots includes assigning a priority level to the outgoing call based on the callback request and adjusting the choice of time slots responsive to the priority level.

In a preferred embodiment, offering the choice of time slots includes downloading over a computer network a time slot pad including the choice of time slots for display on a computer used by the outside party, and receiving the selection includes receiving over the network a selection made on the pad displayed on the computer.

There is also provided, in accordance with a preferred embodiment of the present invention a callback server for use in a communications center, having a central communications switch which generates incoming call event indications responsive to incoming calls to the center, which server is configured so that in response to a request from a party outside the center to establish a communication link with the party, the server establishes an outgoing call to the outside party through the switch such that the switch generates an incoming call event indication responsive to the outgoing call.

There is moreover provided, in accordance with a preferred embodiment of the present invention, a network server for use in a communications center, which server is configured to communicate over a computer network with a party outside the center so as to offer the outside party a choice of time slots at which resources of the center will be available to place an outgoing call to the party and to receive the party's selection of one or more of the time slots, so that the center will place the outgoing call to the party in approximately the selected time slot.

Preferably, the server communicates with a computer used by the outside party to communicate over the network in accordance with the hypertext transfer protocol (HTTP).

There is additionally provided, in accordance with a preferred embodiment of the present invention, a communications center, including:
  a communications switch, which is coupled to a public communications network and which generates incoming call event indications responsive to incoming calls to the center;
  one or more agent stations, which are staffed by respective agents and are connected via the switch to the network;
  a memory, which receives and stores a request from a party outside the center to establish a communication link with the party over the network; and a callback server, which receives the stored request from the memory and, responsive thereto, establishes an outgoing call between one of the agents and the outside party using the switch, such that the switch generates an incoming call indication responsive to the outgoing call.

In a preferred embodiment, an incoming call is placed using a phantom extension of the switch to one of the agents responsive to a request from another party outside the center for a non-voice communication, so that the switch generates an incoming call event indication responsive to the non-voice communication.

In another preferred embodiment, the center includes a computer network server, configured to communicate over a computer network with a computer used by the outside party outside the center so as to offer the party the choice of time slots, and to receive the party's selection of one or more of the time slots and to convey the selection to the callback server.

There is furthermore provided, in accordance with a preferred embodiment of the present invention, computer software product for managing communication between a communications center and a party outside the center, which center has a central communications switch which is configured to generate incoming call event indications responsive to incoming calls to the center, the product including a computer-readable medium having program instructions embedded therein, which when read by a computer in the communications center, cause the computer to receive a request from the party for a callback and to establish an outgoing call to the outside party through the switch, responsive to the request, such that the switch generates an incoming call event indication responsive to the outgoing call.

There is also provided, in accordance with a preferred embodiment of the present invention, a computer software product for managing communication between a communications center and a party outside the center, the product including a computer-readable medium having program instructions embedded therein, which when read by a computer in the communications center, cause the computer to communicate to the outside party a choice of time slots at which resources of the center will be available to place an outgoing call responsive to a callback request by the party, to receive the party's selection of one or more of the time slots, and to cause the outgoing call to the party to be established in approximately the selected time slot.

The present invention will be more fully understood from the following detailed description of the preferred embodiments thereof, taken together with the drawings in which:

DETAILED DESCRIPTION OF PREFERRED EMBODIMENTS

Figure 1:
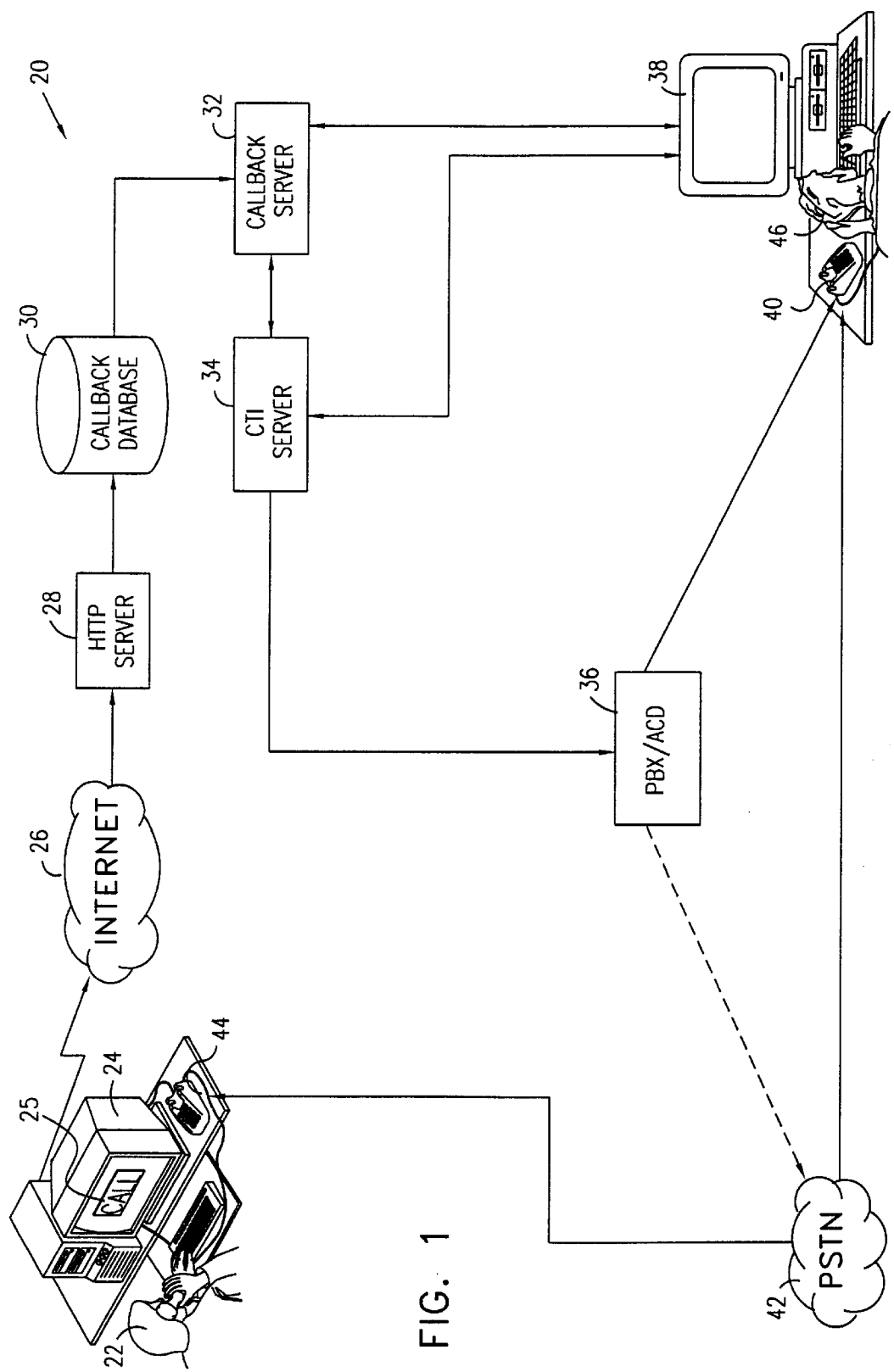
FIG. 1 is a block diagram that schematically illustrates a call center in communication with a customer, in accordance with a preferred embodiment of the present invention.
Figure 2:
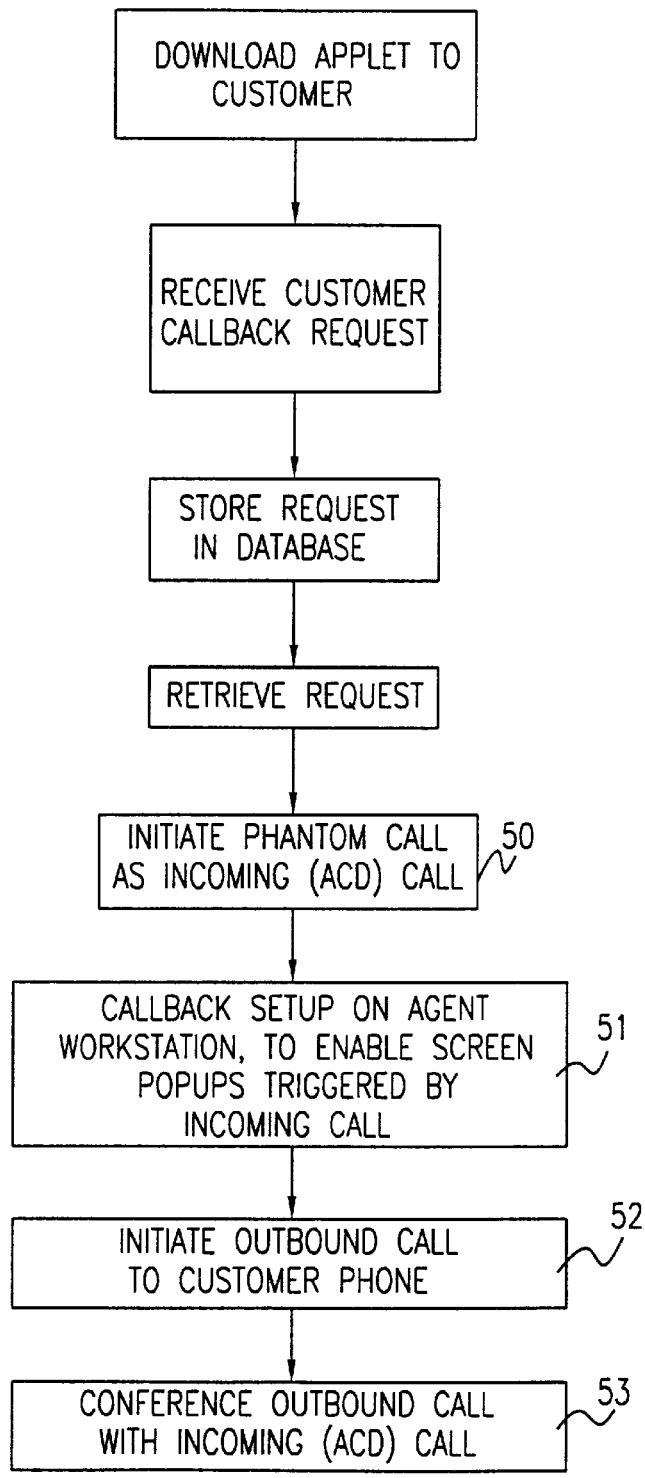
FIG. 2 is a flow chart that schematically illustrates a method for handling a callback in the call center of FIG. 1 so as to imitate an incoming call, in accordance with a preferred embodiment of the present invention.

Reference is now made to FIGS. 1 and 2, which together illustrate a method and system for handling a callback in a call center 20, in accordance with a preferred embodiment of the present invention. FIG. 1 is a block diagram that schematically illustrates call center 20, in communication with a customer 22. FIG. 2 is a flow chart that schematically illustrates a method for handling a callback request from customer 22 and responding thereto with a callback in a manner that imitates an incoming call.

In normal operation, customer 22 uses a personal computer (PC) 24, equipped with a suitable modem and browser software, to communicate over a data network 26, such as the Internet, with a Web site running on a HTTP Web server 28 associated with call center 20. Typically, the Web site displays products and/or services offered by a business that operates the call center. Web pages displayed on the Web site preferably include user controls, such as a suitable on-screen push-button 25, which the customer can select to request that a voice connection be established with the customer by the call center. Such a control might say, "Call me back," for example.

Preferably, when the callback control is selected by the customer, a callback applet, most preferably a Java applet, is downloaded to PC 24 from server 28. The applet causes a pop-up or a new browser page to appear on PC 24, prompting the customer to input one or more telephone numbers at which the customer can be reached, such as the number of a customer telephone 44. The customer may request immediate callback or, optionally, may request a callback at a particular time of day, most preferably using a "time slot pad" as described further hereinbelow. The callback pop-up or page preferably also prompts the customer to input further details of his or her service requirements. When server 28 receives the customer callback request, it passes the information to a callback database 30 stored in a suitable memory. Data transfer between the server and the database is preferably controlled by a suitable Java servlet or, alternatively, by a common gateway interface (CGI) script running on the server.

Customer 22 may alternatively submit callback requests by substantially any other means known in the art. For example, the customer may submit a voice request for a callback by telephone, either to a human operator at call center 20 or to an automated answering system, or may submit a request by fax. In either case, the request can be submitted without the use of computer 24 and network 26. Alternatively, the customer may submit a callback request by electronic mail to a mail server linked to call center 20. Although these additional channels for receiving callback requests are not shown in the figures, their use and integration with other call center functions is well known in the art. All callback requests, regardless of their source, are preferably stored in database 30.

A callback server 32 is responsible for retrieving callback requests from database 30, typically using database access methods such as Open DataBase Connection (ODBC) or Java DataBase Connection (JDBC) if Java is used, and for passing the requests to agents 46, who handle the actual callbacks. Although for the sake of simplicity, only one agent is shown in FIG. 1, it will be understood that call center 20 typically employs many agents, who are grouped according to their skills. Calls and callback requests from customers are assigned to one of the groups of agents according to the particular skills required, as is known in the art. Each agent is equipped with a PC terminal 38, running a suitable callback client program, preferably a "thin client" Java program with graphic user interface (GUI), integrated with other software functions running on the agent PC. Terminals 38 and the various other elements of center 20 are preferably linked by a local area network (LAN), as is known in the art.

Each agent also has a telephone extension 40, linked to communicate with a PSTN 42 through a PBX switch 36. Switch 36 preferably also performs load balancing and automatic call distribution (ACD) functions, typically based on the VDN of incoming calls, as described in the Background of the Invention. Any suitable call center switch may be used for these purposes, such as the above-mentioned Lucent Definity switch, or similar switches made by Meridien and by SumaFour. Alternatively, switch 36 may comprise a standard PBX to which ACD capabilities are added by appropriate software, as offered, for example, by the IBM CallPath Enterprise and Genesis systems. Whenever the switch receives an incoming call, it generates an event indication, which is used to track and assemble statistics on the calls handled by agents 46.

When server 32 retrieves a callback request from the database, it interacts with a CTI server 34 in order to set up the required telephone call by agent 46. CTI server 34 preferably comprises a suitable CallPath or CallPath Enterprise Server, produced by IBM Corporation, with a JTAPI link to switch 36 and agent terminals 38. The functions of servers 32 and 34 are typically performed by dedicated software packages running on general-purpose hardware platforms, which may comprise substantially any type of suitable computer known in the art with an appropriate server operating system. Although the two servers 32 and 34 are shown in FIG. 1 as separate functional blocks, in actuality they preferably run together on a common hardware platform. Callback server 32 is typically supplied to a new or existing call center in the form of a software package, for installation on a computer in the call center. The software package may be transmitted to the call center over a network, or alternatively, it may be supplied on tangible media, such as on CD-ROM.

In response to the callback request, callback server 32 interacts with CTI server 34 and switch 36 so that the callback is set up as an incoming call, by placing an incoming phantom call at an initiate incoming call step 50. The incoming call is preferably, although not necessarily, an ACD call. As a result of the incoming call, switch 36 generates an event indication and balances the call load imposed by the callback as though the callback was a normal incoming call. Server 32 uses the callback client running on terminal 38 to set up the terminal for the callback, preferably using Java remote method invocation (RMI), and notifies agent 46 of the details of the call at a setup step 51, typically by displaying a screen popup on terminal 38. At an initiate outgoing call step 52, the agent's telephone extension 40 is connected via switch 36 and PSTN 42 to the customer's telephone 44. The incoming and outgoing calls are conferenced together at a conference step 53, and the callback is carried out. Details of steps 50–53 are described hereinbelow.

Figure 3:
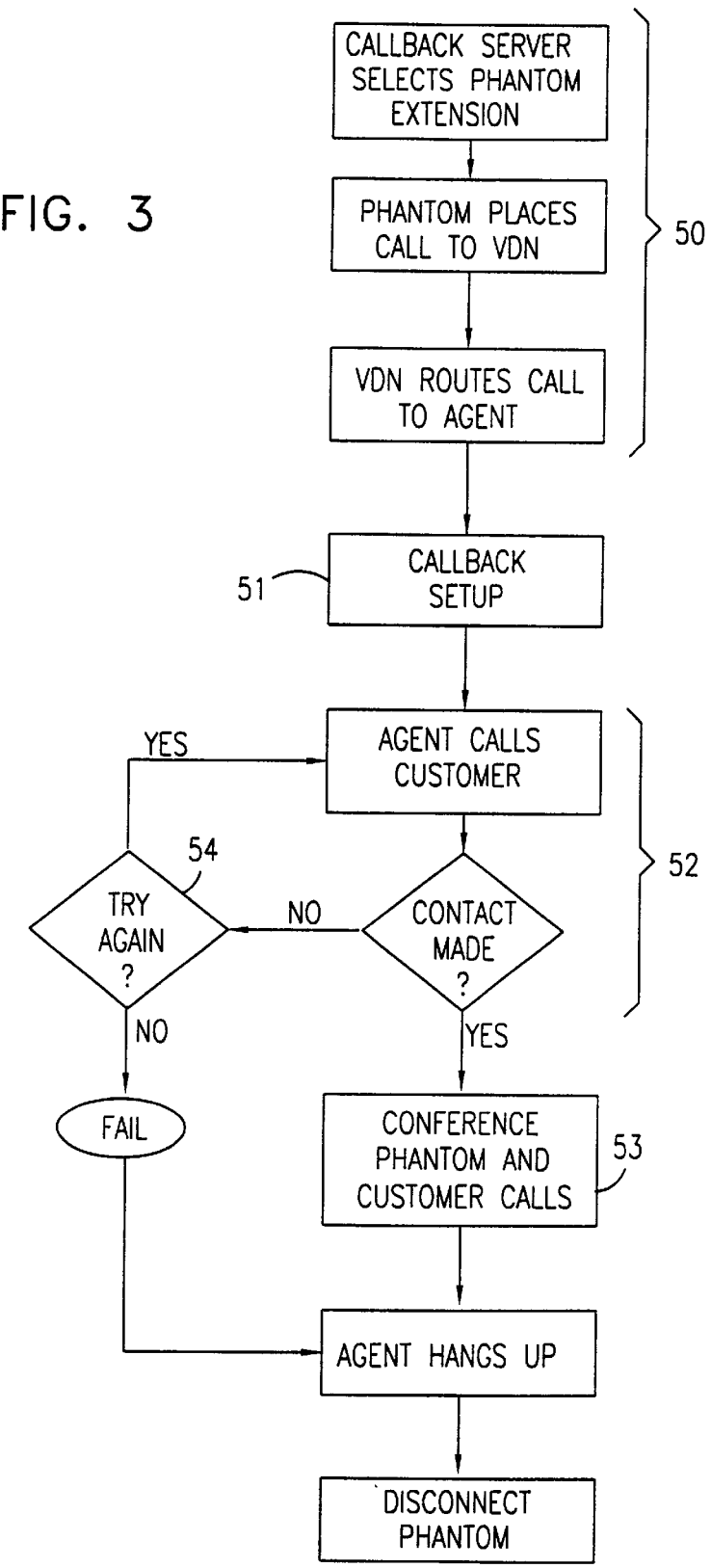
FIG. 3 is a flow chart that schematically illustrates details of the method of FIG. 2, in accordance with a preferred embodiment of the present invention.

FIG. 3 is a flow chart that schematically illustrates details of the method of FIG. 2, and particularly of initiate incoming call step 50 and initiate outgoing call step 52, in accordance with a preferred embodiment of the present invention. In order that switch 36 respond to the callback as an incoming call, rather than as an outgoing call, callback server 32 initiates the callback by selecting a phantom extension of switch 36 and, using CTI server 34, places a call from the phantom to an appropriate VDN, based on callback request information stored in database 30. Switch 36 treats the phantom call as an incoming call, and reports it as such to CTI server 34. Based on the VDN, the switch routes the call to the group of agents 46 having the appropriate skills to handle the call.

Typically, the first available agent in the selected group receives the phantom call on extension 40 and receives callback information on terminal 38. The callback information contains one or more telephone numbers at which customer 22 has asked to be contacted. Agent 46 places the phantom call on hold, while attempting to call the first number specified by the customer. If the first number is busy or unanswered or unsuitable for some other reason (for example, it is answered by a fax machine), a retry procedure 54 is invoked. Details of this procedure are described hereinbelow with reference to FIG. 6. In order to ensure that the connection with the phantom call is not lost, the agent preferably does not directly hang up extension 40 between retries, but rather selects a suitable control on the display of terminal 38, such as "retry," "redial," or "next number," for example.

If retrial is unsuccessful, the agent hangs up the call, preferably by selecting a "hang up" button on the display of terminal 38. Hanging up in this manner disconnects both the agent's attempted outgoing call to the customer and the phantom call, which has meanwhile been kept on hold. The agent is prompted to input information to the terminal in order to update the status of the callback request in database 30.

When agent 46 successfully establishes a voice connection with customer 22, the agent uses controls on extension 40 or on terminal 38 to conference the incoming phantom call and the outgoing call to the customer, at step 53. As the incoming and outgoing calls are conferenced together, switch 36 logs the entire call as an incoming call and accordingly provides call statistics to CTI server 34. From the point of view of load balancing among agents within call center 20, there is no distinction made between agents handling callbacks and those handling true incoming calls. When agent 46 finishes with the callback, he or she hangs up extension 40, preferably using the appropriate on-screen control, and the phantom call is automatically hung up, as well. The agent is then ready for the next incoming call or callback.

Figure 4:
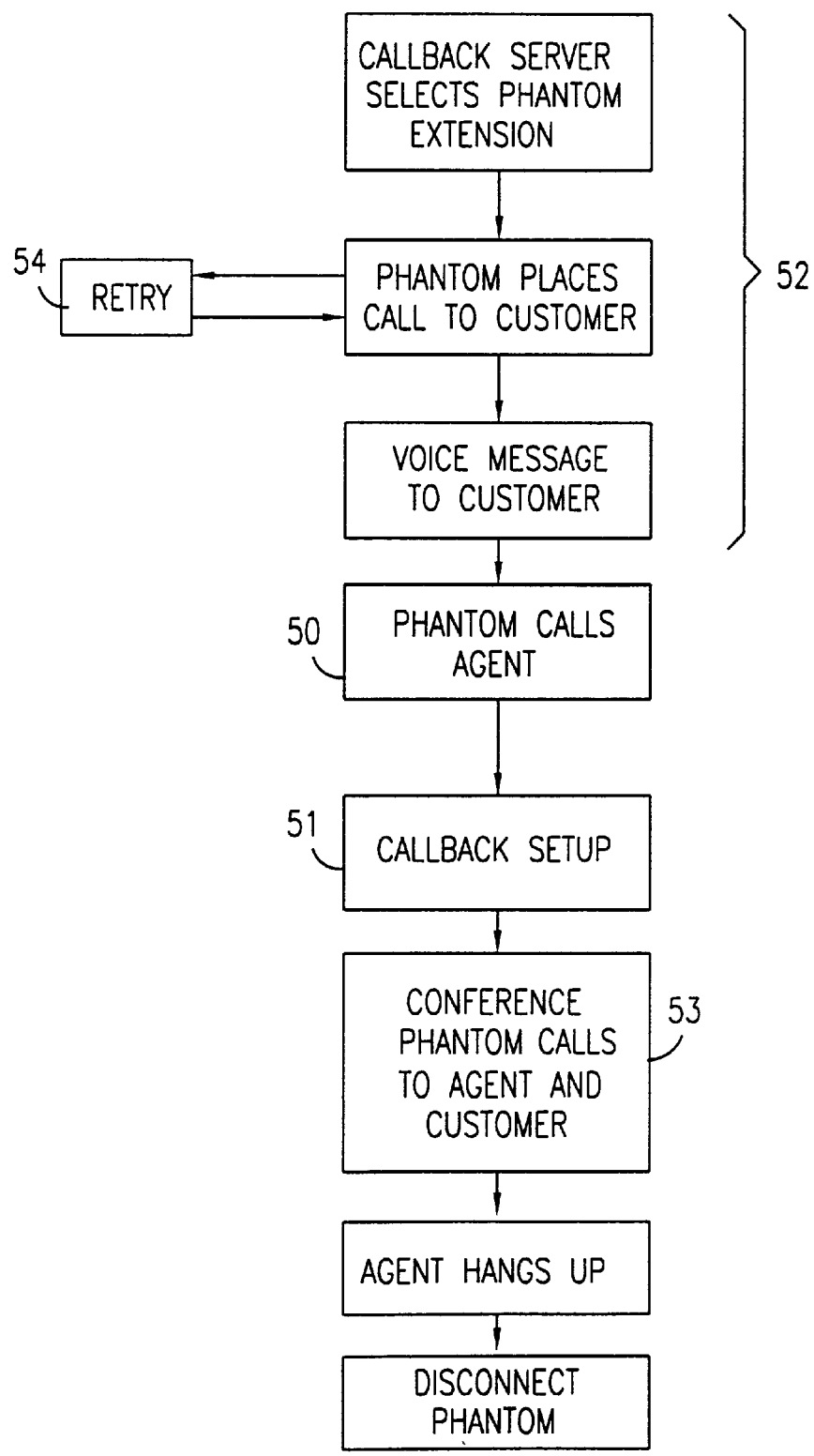
FIG. 4 is a flow chart that schematically illustrates another method for handling a callback, in accordance with an alternative embodiment of the present invention.

FIG. 4 is a flow chart that schematically illustrates another method for handling callbacks in call center 20, in accordance with an alternative embodiment of the present invention. Most of the steps of this alternative method are similar to those of the method of FIG. 2, and are labeled with the same step numbers, albeit in a different order. In this embodiment, the call from call center 20 to customer 22 is placed automatically by callback server 32, rather than by agent 46. To initiate the callback, server 32 selects a phantom extension of switch 36 and uses it to place the outgoing call to telephone 44 specified by the customer, in initiate outgoing call step 52. If the telephone is busy, unanswered or otherwise unsuitable, server 32 automatically invokes retry procedure 54 and, if appropriate, works through a list of possible numbers furnished by the customer. When customer 22 does answer, server 32 actuates a recording or automatic voice response unit telling the customer that a callback connection is being made.

Customer 22 is briefly put on hold while server 32 places an incoming phantom call through switch 36 to extension 40 of agent 46 at step 50. When the agent picks up, the server provides information to the agent regarding the callback on terminal 38 at step 51. At conference step 53, the outgoing call to the customer and the incoming call to the agent are conferenced so that, as described with reference to FIG. 3, switch 36 handles the callback as an incoming call. At the conclusion of the conversation, the agent hangs up extension 40, preferably using on-screen controls, and the phantom extension is hung up, as well.

Figure 5:
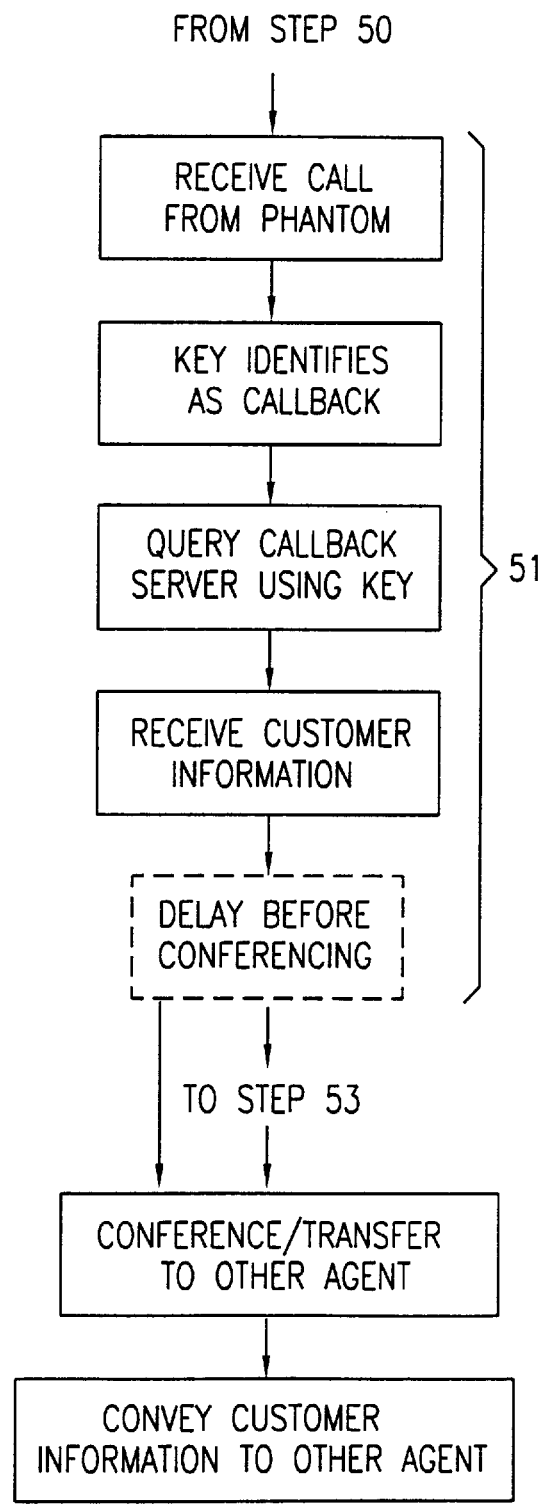
FIG. 5 is a flow chart that schematically illustrates a method for conveying information to an agent performing a callback, in accordance with a preferred embodiment of the present invention.

FIG. 5 is a flow chart that schematically illustrates details of callback setup step 51, whereby agent 46 receives application-specific information for use in a callback to customer 22, in accordance with a preferred embodiment of the present invention. The process described here begins following step 50 in the callback method of FIG. 4, but it may also be used, mutatis mutandis, in conjunction with the method of FIG. 3. It is necessitated by the fact that when the phantom call is placed to agent 46 through switch 36, the switch allows only a small amount of data ancillary to the call to be conveyed to terminal 38 at the same time, rather than all of the relevant data that is generally stored in database 30.

Thus, when agent 46 receives the incoming phantom call on extension 40, a data key is received at the same time identifying the call as a callback. (In call centers known in the art, the agent knows a priori whether the call is an incoming call or a callback—which must be placed as an outgoing call, so that no such identification is necessary.) Responsive to the key, the callback client running on the agent's terminal 38 queries callback server 32 so as to retrieve the relevant information from database 30. Optionally, the voice connection between agent 46 and customer 22 is briefly delayed for a predetermined amount of time while the agent studies the application-specific information and prepares to speak with the customer. The incoming phantom call and outgoing call to the customer are then conferenced at step 53, and the callback proceeds.

It sometimes occurs that the agent who receives the callback does not have all of the necessary know-how to deal with the customer's needs. This may occur while the agent is speaking with the customer or even beforehand, while the agent is studying the customer information from database 30. In such cases, the original agent preferably conferences another, more suitable agent into the call and/or transfers the call for handling by the other agent. Should this occur, it is important that the "incoming" status of the callback be preserved. Therefore, to include another agent in the call, the original agent 46 preferably indicates to the callback client on terminal 38 that the other agent is to be added as a party. The new agent is then conferenced into the incoming phantom call, along with the outgoing call to customer 22, or else the incoming phantom call is transferred to the new agent along with the outgoing customer call.

The callback client on terminal 38 informs callback server 32 of the status of the callback, including transfer or conferencing of the call to another agent when necessary. Server 32 tracks which of the agents (if any) has accepted responsibility for any given callback and passes the relevant application-specific data to that agent. Once the final agent has hung up, the server indicates in the database that the callback has been completed.

Figure 6:
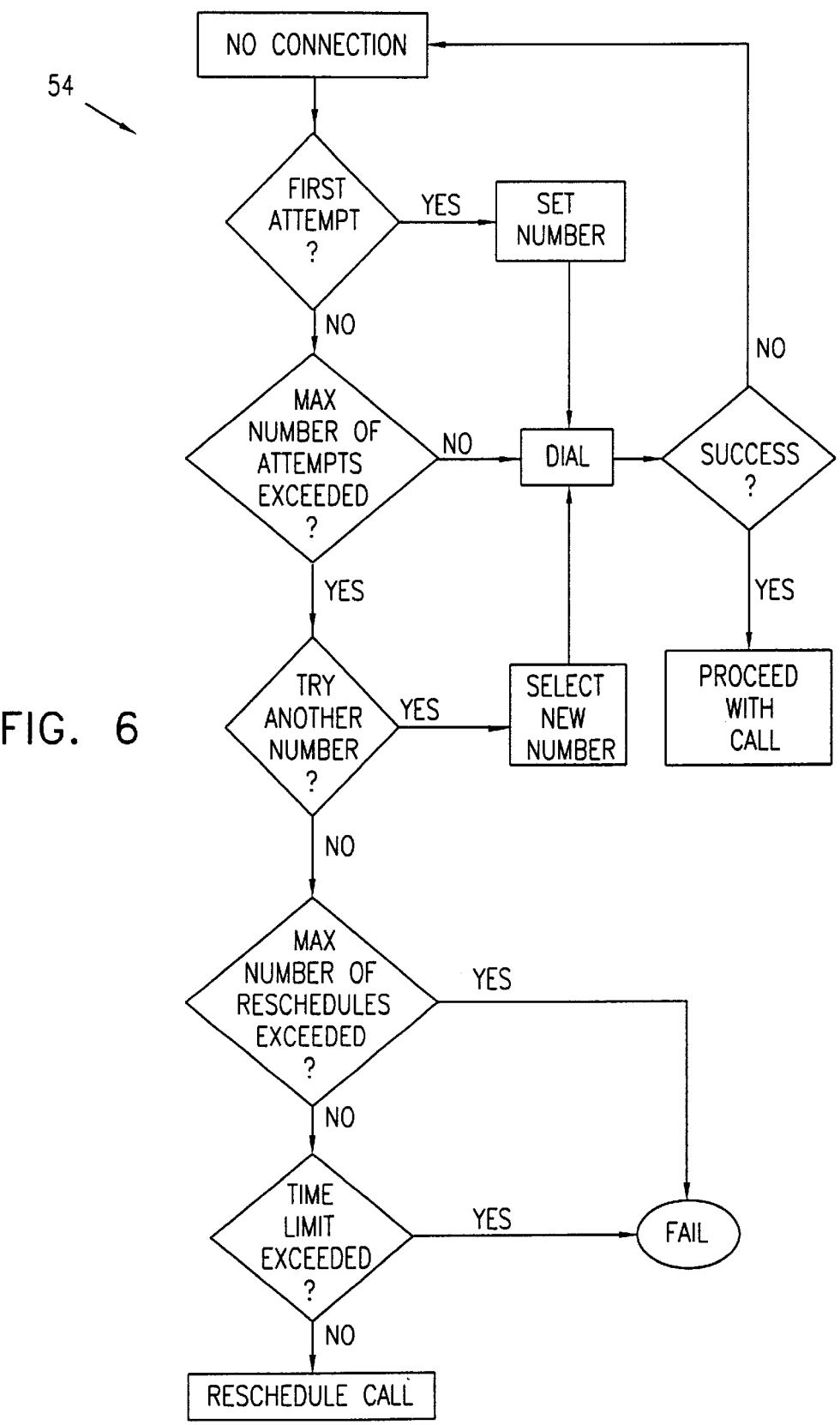
FIG. 6 is a flow chart that schematically illustrates a method for handling callbacks when an initial attempt to reach a telephone number specified by a customer is unsuccessful, in accordance with a preferred embodiment of the present invention.

FIG. 6 is a flow chart that schematically illustrates details of retry procedure 54, in accordance with a preferred embodiment of the present invention. This procedure is used by callback server 32 to track whether a successful callback has been made or, in case it has not, to control when and how additional callback attempts are made. The method includes parameters, such as the number of times that a callback should be reattempted or rescheduled in the event of a failed attempt. The parameters are preferably adjustable so as to strike a desired balance between providing service to the customer who has made the callback request and freeing call center resources for other customers.

When an attempt to dial a callback number provided by a customer is unsuccessful, the number is retried until a predetermined maximum number of attempts have been made. If the attempt to reach the customer at the first callback number is successful, server 32 or, alternatively, the callback client running on terminal 38 checks to determine whether the customer has provided another number that has not yet been tried. If so, a callback is attempted on the other number, until all possible numbers have been exhausted.

If none of the customer's numbers was reachable, the callback request is returned to server 32. Generally, the server reschedules the callback for a later time, at which the entire callback procedure is recommenced. Before doing so, however, the server checks to see whether this is the first rescheduling, or whether the callback has already been rescheduled once or more. If the callback has already been rescheduled in the past, the server checks to determine how much time has elapsed since the customer's callback request was submitted or since the time that the customer originally specified for the callback. If the call has already been rescheduled more than a predetermined maximum number of times, or if the time elapsed since the callback request or the original callback time has exceeded a predetermined limit, no further callback attempts are made, and server 32 marks the callback record in database 30 as a failed callback. Otherwise, the callback remains pending in the database for later action.

Figure 7:
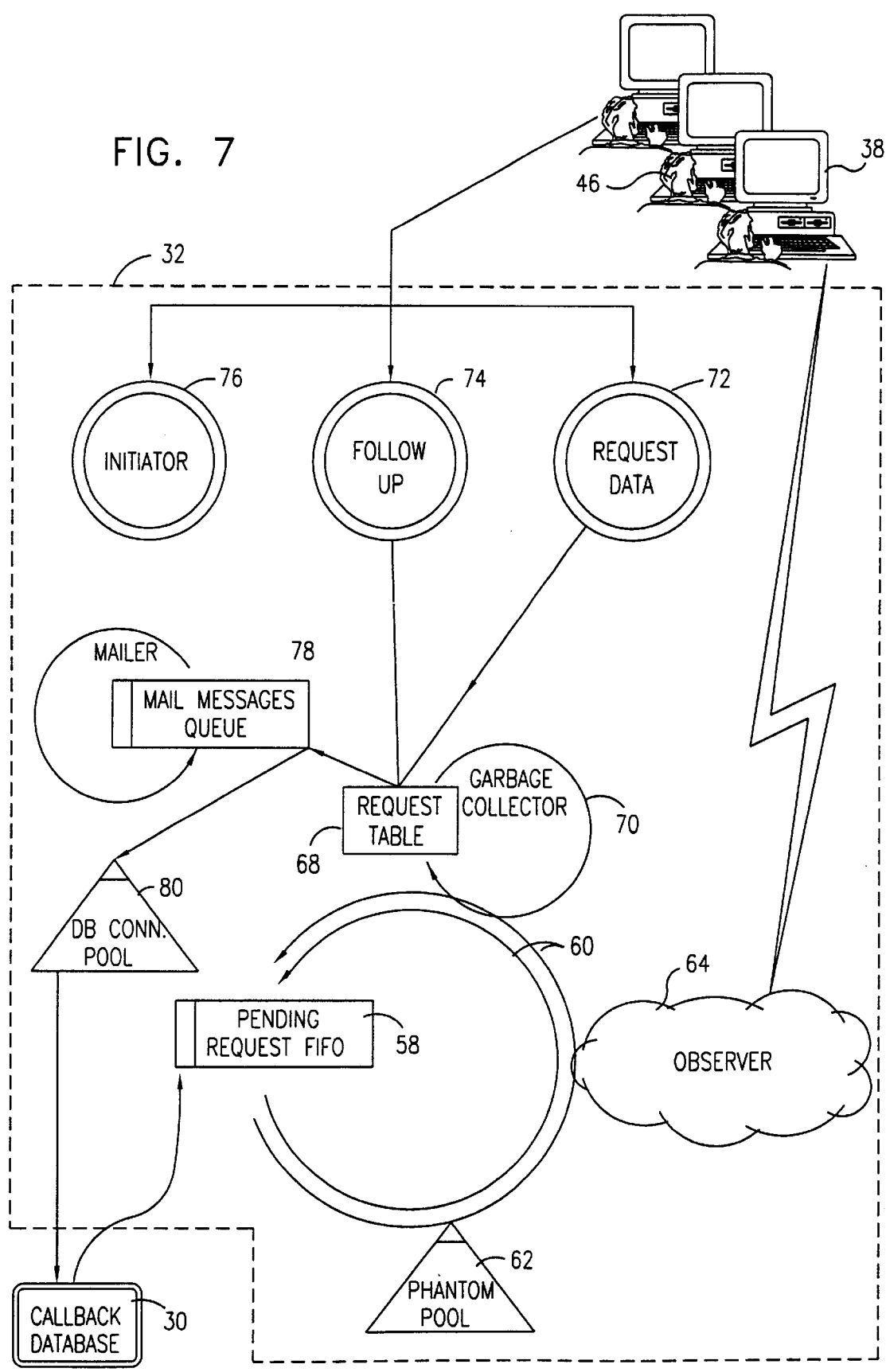
FIG. 7 is a block diagram that schematically illustrates the operation of a callback server in the system of FIG. 1, in accordance with a preferred embodiment of the present invention.

FIG. 7 is a block diagram that schematically illustrates processes occurring on callback server 32 in the course of carrying out the methods described hereinabove, in accordance with a preferred embodiment of the present invention. Pending callback requests that are due for action are retrieved from database 30 by an initiator 76 and entered in a first-in first-out (FIFO) buffer 58. Program threads 60, represented by curved arrows, are respectively assigned to the pending requests as they come to the head of the buffer. Each thread 60 picks up a phantom extension of switch 36 from a pool 62 of such phantoms, for use in making the necessary incoming call to agent extension 40.

Thread 60 also initiates a process known as an observer 64, which is responsible for communicating with agent terminal 38 and tracking the progress of the callback. This observer also generates and maintains the callback user interface elements on terminal 38. Preferably, for every call that is made in connection with the callback, observer 64 creates a new, private observer, which is subsidiary to the original observer. Agent terminal 38 registers with the appropriate observer 64 for each call in which the respective agent 46 is involved, so that the terminal will receive all relevant events of interest even when the agent is involved in multiple concurrent calls. The observers are preferably numbered serially, and the oldest observer is treated as the dominant one, so that all calls associated with a callback are maintained in proper order and organization. The use of observer 64 and its subsidiary observers also enables agent 46 to participate in multiple callbacks simultaneously, while maintaining the distinct incoming call status and tracking of each one of them.

When agent 46 receives a callback to deal with, the agent uses the client program on terminal 38 to invoke a request data process 72 on server 32, in order to obtain the application-specific information needed for the callback. The data request is entered in a request table 68, where it is serviced by the appropriate thread 60.

Finally, when the callback is completed, the client program invokes a follow-up process 74. This process updates table 68 and, preferably, puts an e-mail message to customer 22 in a mail message queue 78. The message is sent to the customer to confirm the results of the callback conversation. Process 74 then takes a connection to database 30 from a database connection pool 80 and uses it to update the database as to the results of the callback. A garbage collector function 70 clears request table 68 of completed callbacks.

Figure 8:
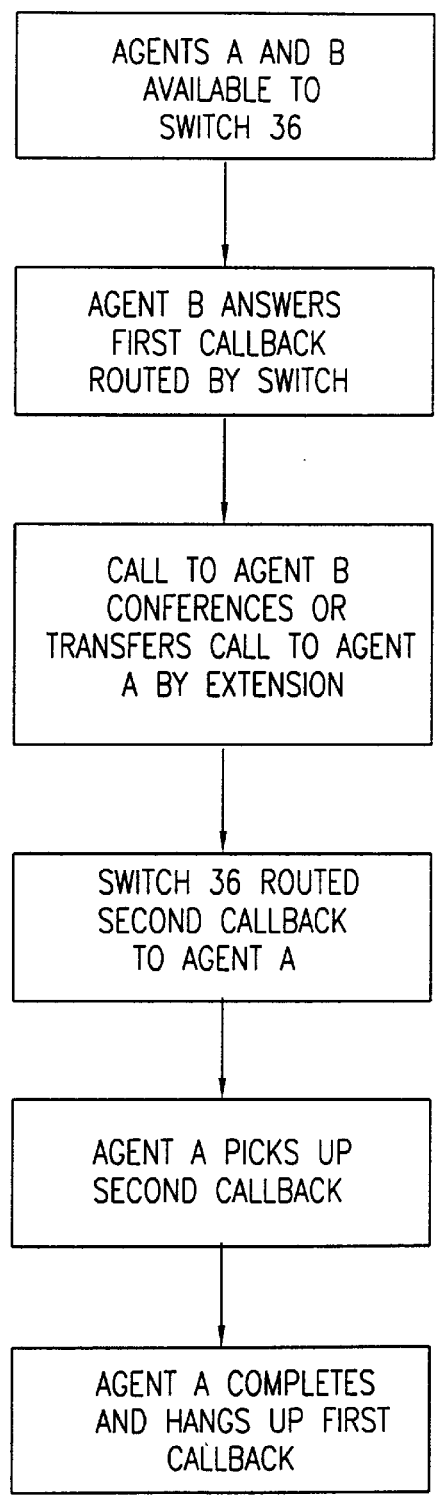
FIG. 8 is a flow chart that schematically illustrates a method for carrying out multiple callbacks by a single agent simultaneously, in accordance with a preferred embodiment of the present invention.

FIG. 8 is a flow chart that schematically illustrates handling of two concurrent callbacks by a given agent in call center 20, in accordance with a preferred embodiment of the present invention. Each of the callbacks has its own associated incoming phantom call, so that both callbacks are treated by switch 36 as incoming calls. Each of the callbacks is tracked by its own observer 64, as described hereinabove with reference to FIG. 7.

Initially, switch 36 notes that both agents A and B are available for incoming calls. Thus, when callback server 32 initiates a first callback to a customer, by placing an incoming phantom call through switch 36, the call is routed to and answered by agent B. Agent B speaks with the customer and at a certain point in the conversation decides that agent A should be consulted, because the customer has asked a question in an area in which A is particularly expert, for example. Agent B therefore transfers the call to agent A by extension, so that they can confer with the customer.

While agent A is involved in the first callback by extension from agent B, server 32 initiates a second callback, and switch 36 routes the resultant incoming phantom call to agent A. Agent A picks up this second callback and, typically, puts it on hold while finishing the conference with B. Finally, agent A completes the conference and hangs up on B (who may continue talking with that customer), and then goes on with the second callback conversation.

Call center 20 thus allows agents 46 to handle at least two calls simultaneously, including callbacks. Preferably, for each agent in the call center, there is a predefined number of simultaneous calls that the agent can handle. These calls include not only voice calls and callbacks, as described hereinabove, but also other delivery channels, such as e-mail, text chat and IP telephony.

Figure 9:
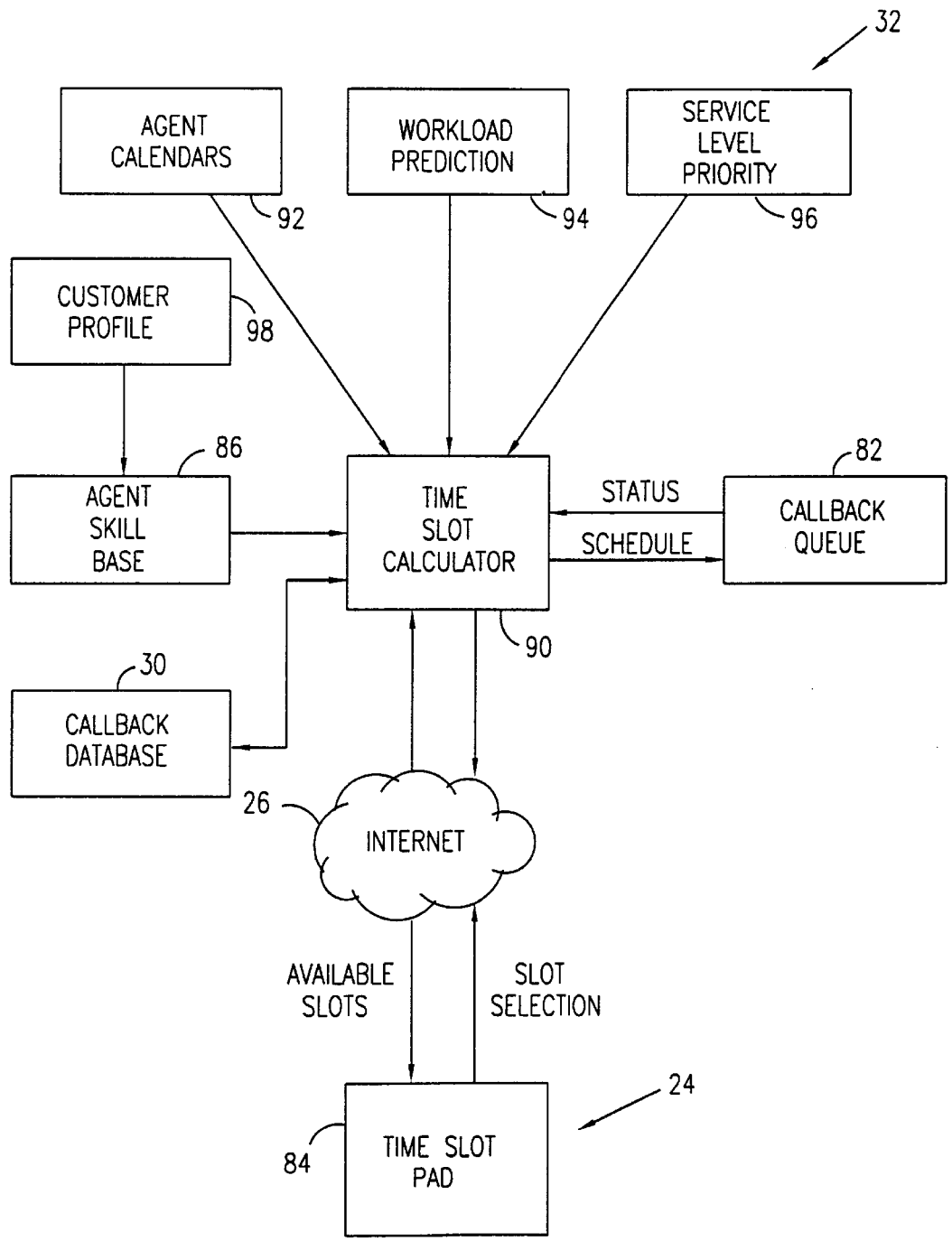
FIG. 9 is a block diagram that schematically illustrates a method for scheduling of callbacks to customers, in accordance with a preferred embodiment of the present invention.

FIG. 9 is a block diagram that schematically illustrates a method for scheduling of callbacks to customers, in accordance with a preferred embodiment of the present invention. Callback server 32 performs the function of a time slot calculator 90, for assigning execution times to customer callback requests. Calculator 90 interacts with customer computer 24 via network 26 in order to receive callback requests and to schedule callbacks. As described hereinbelow, when customer 22 requests a callback, calculator 90 determines times of day during which appropriate agents in call center 20 will be available to deal with the particular needs of the customer. Based on this determination, callback server 32 informs HTTP server 28 of the available times. The HTTP server displays the availability information in the form of a "time slot pad" 84, which appears on the callback browser page or pop-up on computer 24. The time slot pad is preferably generated by the callback applet downloaded to computer 24 (FIG. 2).

Using time slot pad 84, customer 22 selects his or her preferred callback time from among the available time slots. The customer's selection is passed from the HTTP server back to callback server 32 and is entered in database 30. In the case of a request for immediate callback, server 32 enters the request in a callback queue 82, along with other pending callback requests that are scheduled for immediate action. The function of this queue may be carried out by pending request FIFO 58, shown in FIG. 7. If calculator 90 determines that the queue is too long, the possibility of immediate callback may be blocked out on time slot pad 84, and the customer will have to select a later time.

Various other factors are also taken into account by time slot calculator 90 in making callback times available to customers. Callback requests are sorted based on customer needs, such as the type of product or service that the customer requires. These needs are matched by calculator 90 against a database 86 of available agent skills. Thus, in building time slot pad 84, the calculator considers the availability of agents having the required skills based on the information provided in the callback request. This information is preferably supplemented by a customer profile 98 that the call center maintains regarding existing customers. Agent availability is determined on the basis of attendance calendars 92 of the agents and the backlog of callback requests requiring particular agent skills, which is used to make a prediction 94 of those agents' workload.

Callback server 32 prioritizes the callback requests in queue 82 according to queue management criteria, based, for example, on customer profile 98 and types of service requests. Optionally, the server also takes into account a service level priority 96, whereby certain customers, such as those who have high-priority service agreements with call center 20, are moved to the head of queue 82. Such customers may be offered callback time slots that are not made available to customers with lower priority levels.

A further function of workload prediction 94 in server 32 is to alert administrators of call center 20 when there may be an overload of work due to an excessive number of callback requests. Underloads can also be predicted in this manner. The administrators preferably use these predictions to modify agent calendars 92 so that agent availability matches the expected work load of the call center.

Although preferred embodiments described hereinabove relate specifically to management of callbacks, the architecture of call center 20 and the methods of the present invention may similarly be applied to manage other types of customer service requests. Thus, for example, phantom calls through switch 36 can be associated with different types of service requests, including requests for non-voice communications such as text chat and e-mail, so that there is a single point of control (in this case the switch, whether hardware- or software-controlled) for substantially all of the different request types.

Moreover, although some preferred embodiments are described hereinabove with reference to the architecture of call center 20, it will be appreciated that the principles of the present invention are not limited to this particular framework. The notion of handling callbacks so as to imitate incoming calls can be advantageously implemented in many types of call centers. Furthermore, aspects of the methods described hereinabove for planning and scheduling callbacks can be used even when such callbacks are not handled as incoming calls. All combinations and sub-combinations of elements and methods described herein are considered to be within the scope of the present invention.

It will thus be understood that the preferred embodiments described above are cited by way of example, and the full scope of the invention is limited only by the claims.

What is claimed is:

1. A method for managing communication between a communications center and a party outside the center, which center has a central communications switch which is configured to generate incoming call event indications responsive to incoming calls to the center, comprising:
   receiving a request from the party for a callback; and
   establishing an outgoing call to the outside party through the switch, responsive to the request, such that the switch generates an incoming call event indication responsive to the outgoing call,
   wherein establishing the outgoing call comprises placing an incoming call and an outgoing call through the switch, responsive to the request, and conferencing the outgoing and incoming calls so that the event indication is generated responsive to the outgoing call, and
   wherein placing the incoming call comprises placing a call on a phantom extension of the switch.

2. A method for managing communication between a communications center and a party outside the center, which center has a central communications switch which is configured to generate incoming call event indications responsive to incoming calls to the center, comprising:
   receiving a request from the party for a callback; and
   establishing an outgoing call to the outside party through the switch, responsive to the request, such that the switch generates an incoming call event indication responsive to the outgoing call,
   wherein establishing the outgoing call comprises placing an incoming call and an outgoing call through the switch, responsive to the request, and conferencing the outgoing and incoming calls so that the event indication is generated responsive to the outgoing call, and
   wherein the center is staffed by one or more agents at respective agent stations, and wherein placing the incoming call comprises placing an incoming call to one of the agents who is to speak with the outside party on the outgoing call, and
   wherein placing the incoming call comprises placing a call on a phantom extension of the switch.

3. A method according to claim 2, and comprising connecting another one of the agents in the center to the outgoing call while the outgoing and incoming calls remain conferenced.

4. A method according to claim 3, wherein the other one of the agents remains connected to the outgoing call while receiving another incoming call.

5. A method according to claim 4, wherein the other incoming call is placed to the other agent responsive to another callback request from another outside party.

6. A method according to claim 2, wherein receiving the request from the outside party comprises storing information related to the request in a database, and comprising, responsive to the incoming call, conveying the information from the database to the agent who is to speak with the outside party.

7. A method for managing communication between a communications center and a party outside the center, which center has a central communications switch which is configured to generate incoming call event indications responsive to incoming calls to the center, comprising:
   receiving a request from the party for a callback; and
   establishing an outgoing call to the outside party through the switch, responsive to the request, such that the switch generates an incoming call event indication responsive to the outgoing call,
   and comprising recording information regarding the outgoing call using the incoming call event indication generated responsive thereto,
   wherein establishing the outgoing call comprises placing an incoming call and an outgoing call through the switch, responsive to the request, and conferencing the outgoing and incoming calls so that the event indication is generated responsive to the outgoing call, and
   wherein placing the incoming call comprises placing a call on a phantom extension of the switch.

8. A method for managing communication between a communications center and a party outside the center, which center has a central communications switch which is configured to generate incoming call event indications responsive to incoming calls to the center, comprising:
   receiving a request from the party for a callback; and
   establishing an outgoing call to the outside party through the switch, responsive to the request, such that the switch generates an incoming call event indication responsive to the outgoing call,
   wherein the center is staffed by one or more agents at respective agent stations, and comprising balancing a load of incoming and outgoing calls among the agents responsive to the incoming call event indications generated responsive to the incoming and outgoing calls, and
   wherein establishing the outgoing call comprises placing an incoming call and an outgoing call through the switch, responsive to the request, and conferencing the outgoing and incoming calls so that the event indication is generated responsive to the outgoing call, and
   wherein placing the incoming call comprises placing a call on a phantom extension of the switch.

9. A method for managing communication between a communications center and a party outside the center, which center has a central communications switch which is configured to generate incoming call event indications responsive to incoming calls to the center, comprising:
   receiving a request from the party for a callback; and
   establishing an outgoing call to the outside party through the switch, responsive to the request, such that the switch generates an incoming call event indication responsive to the outgoing call,
   wherein receiving the request comprises receiving a request to make the callback at a time specified by the outside party, and wherein establishing the outgoing call comprises placing a call at approximately the specified time, and wherein establishing the outgoing call comprises placing an incoming call and an outgoing call through the switch, responsive to the request, and conferencing the outgoing and incoming calls so that the event indication is generated responsive to the outgoing call, and wherein placing the incoming call comprises placing a call on a phantom extension of the switch.

10. A method according to claim 9, wherein receiving the request comprises offering the outside party a choice of time slots for the callback responsive to predicted availability of call resources at the center and receiving the party's selection of one or more of the time slots.

11. A callback server for use in a communications center, having a central communications switch which generates incoming call event indications responsive to incoming calls to the center, which server is configured so that in response to a request from a party outside the center to establish a communication link with the party, the server establishes an outgoing call to the outside party through the switch such that the switch generates an incoming call event indication responsive to the outgoing call, wherein the callback server causes an incoming call and an outgoing call to be placed through the switch, responsive to the request, wherein the outgoing and incoming calls are conferenced together so that the event indication is generated responsive to the outgoing call wherein the incoming call is placed using a phantom extension of the switch, and wherein the incoming call is placed using a phantom extension of the switch.

12. A callback server for use in a communications center, having a central communications switch which generates incoming call event indications responsive to incoming calls to the center, which server is configured so that in response to a request from a party outside the center to establish a communication link with the party, the server establishes an outgoing call to the outside party through the switch such that the switch generates an incoming call event indication responsive to the outgoing call, wherein the callback server causes an incoming call and an outgoing call to be placed through the switch, responsive to the request, wherein the outgoing and incoming calls are conferenced together so that the event indication is generated responsive to the outgoing call wherein the incoming call is placed using a phantom extension of the switch, and wherein the center is staffed by one or more agents at respective agent stations, and wherein the incoming call is placed to one of the agents who is to speak with the outside party on the outgoing call, and wherein the incoming call is placed using a phantom extension of the switch.

13. A server according to claim 12, wherein information related to the request is stored in a database, and wherein the server, responsive to the incoming call, conveys the information from the database to the agent who is to speak with the outside party.

14. A server according to claim 13, wherein upon completion of the outgoing call, the server stores information regarding the call in the database.

15. A callback server for use in a communications center, having a central communications switch which generates incoming call event indications responsive to incoming calls to the center, which server is configured so that in response to a request from a party outside the center to establish a communication link with the party, the server establishes an outgoing call to the outside party through the switch such that the switch generates an incoming call event indication responsive to the outgoing call, wherein the server calculates a predicted availability of call resources at the center and, based on the calculation, offers the outside party a choice of time slots at which to request the communication link and establishes the outgoing call responsive to the party's selection of one or more of the time slots, wherein the callback server causes an incoming call and an outgoing call to be placed through the switch, responsive to the request, wherein the outgoing and incoming calls are conferenced together so that the event indication is generated responsive to the outgoing call wherein the incoming call is placed using a phantom extension of the switch, and wherein the incoming call is placed using a phantom extension of the switch.

16. A communications center, comprising:

a communications switch, which is coupled to a public communications network and which generates incoming call event indications responsive to incoming calls to the center;

one or more agent stations, which are staffed by respective agents and are connected via the switch to the network;

a memory, which receives and stores a request from a party outside the center to establish a communication link with the party over the network; and a callback server, which receives the stored request from the memory and, responsive thereto, establishes an outgoing call between one of the agents and the outside party using the switch, such that the switch generates an incoming call event indication responsive to the outgoing call, wherein the callback server causes an incoming call and an outgoing call to be placed through the switch, responsive to the request, wherein the outgoing and incoming calls are conferenced together so that the event indication is generated responsive to the outgoing call, and wherein the switch has one or more phantom extensions, and wherein the incoming call is placed using one of the phantom extensions to one of the agents who is to speak with the outside party on the outgoing call.

17. A center according to claim 16, wherein each of the agent stations comprises a computer terminal and a voice terminal, and wherein responsive to the incoming call to the voice terminal of the agent who is to speak with the outside party, the callback server conveys information regarding the outside party from the memory to the agent's computer terminal.

18. A center according to claim 16, wherein an incoming call is placed using one of the phantom extensions to one of the agents responsive to a request from another party outside the center for a non-voice communication, so that the switch generates an incoming call event indication responsive to the non-voice communication.

19. A communications center, comprising:

a communications switch, which is coupled to a public communications network and which generates incoming call event indications responsive to incoming calls to the center;

one or more agent stations, which are staffed by respective agents and are connected via the switch to the network;

a memory, which receives and stores a request from a party outside the center to establish a communication link with the party over the network; and a callback server, which receives the stored request from the memory and, responsive thereto, establishes an outgoing call between one of the agents and the outside party using the switch, such that the switch generates an incoming call event indication responsive to the outgoing call, wherein information regarding the outgoing call is recorded in the memory using the incoming call event indication generated by the switch responsive to the outgoing call, and wherein the callback server causes an incoming call and an outgoing call to be placed through the switch, responsive to the request, wherein the outgoing and incoming calls are conferenced together so that the event indication is generated responsive to the outgoing call, and wherein the switch has one or more phantom extensions, and wherein the incoming call is placed using one of the phantom extensions to one of the agents who is to speak with the outside party on the outgoing call.

20. A communications center, comprising:

a communications switch, which is coupled to a public communications network and which generates incoming call event indications responsive to incoming calls to the center;

one or more agent stations, which are staffed by respective agents and are connected via the switch to the network;

a memory, which receives and stores a request from a party outside the center to establish a communication link with the party over the network; and a callback server, which receives the stored request from the memory and, responsive thereto, establishes an outgoing call between one of the agents and the outside party using the switch, such that the switch generates an incoming call event indication responsive to the outgoing call, wherein the center balances a load of incoming and outgoing calls among the agents responsive to the incoming call event indications generated by the switch responsive to the incoming and outgoing calls, and wherein the callback server causes an incoming call and an outgoing call to be placed through the switch, responsive to the request, wherein the outgoing and incoming calls are conferenced together so that the event indication is generated responsive to the outgoing call, and wherein the switch has one or more phantom extensions, and wherein the incoming call is placed using one of the phantom extensions to one of the agents who is to speak with the outside party on the outgoing call.

21. A communications center, comprising:

a communications switch, which is coupled to a public communications network and which generates incoming call event indications responsive to incoming calls to the center;

one or more agent stations, which are staffed by respective agents and are connected via the switch to the network;

a memory, which receives and stores a request from a party outside the center to establish a communication link with the party over the network; and a callback server, which receives the stored request from the memory and, responsive thereto, establishes an outgoing call between one of the agents and the outside party using the switch, such that the switch generates an incoming call event indication responsive to the outgoing call, wherein the callback server offers the outside party a choice of time slots for the callback, and establishes the outgoing call responsive to the party's selection of one or more of the time slots, and wherein the callback server causes an incoming call and an outgoing call to be placed through the switch, responsive to the request, wherein the outgoing and incoming calls are conferenced together so that the event indication is generated responsive to the outgoing call, and wherein the switch has one or more phantom extensions, and wherein the incoming call is placed using one of the phantom extensions to one of the agents who is to speak with the outside party on the outgoing call.

22. A center according to claim 21, and comprising a computer network server, configured to communicate over a computer network with a computer used by the outside party outside the center so as to offer the party the choice of time slots, and to receive the party's selection of one or more of the time slots and to convey the selection to the callback server.

23. A computer software product for managing communication between a communications center and a party outside the center, which center has a central communications switch which is configured to generate incoming call event indications responsive to incoming calls to the center, the product comprising a computer-readable medium having program instructions embedded therein, which when read by a computer in the communications center, cause the computer to receive a request from the party for a callback and to establish an outgoing call to the outside party through the switch, responsive to the request, such that the switch generates an incoming call event indication responsive to the outgoing call, wherein the callback server causes an incoming call and an outgoing call to be placed through the switch, responsive to the request, wherein the outgoing and incoming calls are conferenced together so that the event indication is generated responsive to the outgoing call wherein the incoming call is placed using a phantom extension of the switch, and wherein the incoming call is placed using a phantom extension of the switch.

* * * * *